(12) United States Patent
Yuasa et al.

(10) Patent No.: US 10,642,554 B2
(45) Date of Patent: May 5, 2020

(54) CONTROL APPARATUS FOR ASSIGNING A PRINT JOB, IMAGE FORMING APPARATUS, IMAGE FORMING SYSTEM, AND PROGRAM

(71) Applicant: KONICA MINOLTA, INC., Chiyoda-ku, Tokyo (JP)

(72) Inventors: Kei Yuasa, Hino (JP); Natsuko Minegishi, Hachioji (JP); Tetsuya Ishikawa, Sagamihara (JP); Hiroki Shibata, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/275,558

(22) Filed: Feb. 14, 2019

(65) Prior Publication Data

US 2019/0294396 A1 Sep. 26, 2019

(30) Foreign Application Priority Data

Mar. 22, 2018 (JP) .................................. 2018-053991

(51) Int. Cl.
*G06F 3/12* (2006.01)

(52) U.S. Cl.
CPC .......... *G06F 3/1261* (2013.01); *G06F 3/1205* (2013.01); *G06F 3/1226* (2013.01); *G06F 3/1232* (2013.01); *G06F 3/1288* (2013.01)

(58) Field of Classification Search
CPC .... G06F 3/1261; G06F 3/1205; G06F 3/1226; G06F 3/1232; G06F 3/1288

USPC .................................................. 358/1.1–1.18
See application file for complete search history.

(56) References Cited

U.S. PATENT DOCUMENTS

| | | | | |
|---|---|---|---|---|
| 2004/0098480 | A1* | 5/2004 | Sekizawa | G06F 11/3006 709/224 |
| 2009/0287806 | A1* | 11/2009 | Hamilton, II | G06F 3/1219 709/223 |
| 2010/0020357 | A1* | 1/2010 | Amino | G03G 15/553 358/1.15 |
| 2016/0334744 | A1* | 11/2016 | Nogami | G06F 3/121 |
| 2018/0173148 | A1* | 6/2018 | Etou | G03G 15/553 |

FOREIGN PATENT DOCUMENTS

| | | |
|---|---|---|
| JP | H1138845 A | 2/1999 |
| JP | 2009238072 A | 10/2009 |
| JP | 2014017728 A | 1/2014 |

* cited by examiner

*Primary Examiner* — Gabriel I Garcia
(74) *Attorney, Agent, or Firm* — Buchanan Ingersoll & Rooney PC

(57) ABSTRACT

A control apparatus includes: a communicator that communicates with an image forming apparatus capable of executing a print job; and a hardware processor that obtains, for each of the image forming apparatuses in communication with the communicator, a degree of variations in remaining endurance of each of a plurality of units included in the image forming apparatus, wherein the hardware processor assigns a print job to the image forming apparatus having the smallest degree of variations.

14 Claims, 11 Drawing Sheets

⇨

| LOAD INFORMATION CALCULATION RULE ||
|---|---|
| UNIT | POINT |
| PHOTOSENSITIVE DRUM | 3 |
| FIXING PART | 1 |

⇨

| LOAD INFORMATION CALCULATION RULE ||
|---|---|
| UNIT | POINT |
| PHOTOSENSITIVE DRUM | 1 |
| FIXING PART | 3 |

UNIT (11): ○○ POINTS REMAINING
UNIT (12): △△ POINTS REMAINING
⋮

| PRINTER | UNIT | REMAINING ENDURANCE OF UNIT (BEFORE PRINT JOB EXECUTION) | NUMBER OF PRINTED SHEETS (10 SHEETS) | REMAINING ENDURANCE OF UNIT (AFTER PRINT JOB EXECUTION) | STANDARD DEVIATION σ OF REMAINING ENDURANCE OF UNIT |
|---|---|---|---|---|---|
| PRINTER (1) | PHOTOSENSITIVE DRUM | 50 | 30 | 20 | 120 |
|  | FIXING PART | 200 | 10 | 190 |  |
| PRINTER (2) | PHOTOSENSITIVE DRUM | 200 | 30 | 170 | 92 |
|  | FIXING PART | 50 | 10 | 40 |  |

FIG. 6A

| UNIT | INITIAL REMAINING ENDURANCE OF UNIT |
|---|---|
| PHOTOSENSITIVE DRUM | 600 |
| FIXING PART | 800 |

FIG. 6B

| LOAD INFORMATION CALCULATION RULE | | |
|---|---|---|
| UNIT | PRINT JOB | |
| | IMAGE JOB | CHARACTER JOB |
| PHOTOSENSITIVE DRUM | 1 | 3 |
| FIXING PART | 3 | 1 |

FIG. 6C

| PRINT CONTENTS | |
|---|---|
| PRINT TYPE | NUMBER OF PRINTED SHEETS |
| IMAGE | 50 SHEETS |
| CHARACTER | 50 SHEETS |

FIG. 6D

| PRESENCE/ABSENCE OF LEVELING PROCESS | PRINTER | UNIT | REMAINING ENDURANCE OF UNIT |
|---|---|---|---|
| ABSENCE | PRINTER (3) | PHOTOSENSITIVE DRUM | 200 |
| | | FIXING PART | 600 |
| | PRINTER (4) | PHOTOSENSITIVE DRUM | 600 |
| | | FIXING PART | 200 |
| PRESENCE | PRINTER (5) | PHOTOSENSITIVE DRUM | 200 |
| | | FIXING PART | 600 |
| | PRINTER (6) | PHOTOSENSITIVE DRUM | 600 |
| | | FIXING PART | 200 |

FIG. 11A

| PRINTER (1) | UNIT NO. | 1 | 2 | 3 | 4 | 5 | 6 | 7 | 8 | 9 | 10 |
|---|---|---|---|---|---|---|---|---|---|---|---|
| | REMAINING ENDURANCE OF UNIT | 250 | 240 | 230 | 220 | 210 | 70 | 60 | 50 | 40 | 30 |

FIG. 11B $\sigma = 7.1$

| PRINTER (1) | UNIT NO. | 9 | 10 |
|---|---|---|---|
| | REMAINING ENDURANCE OF UNIT | 40 | 30 |

FIG. 11C $\sigma = 10.1$

| PRINTER (1) | UNIT NO. | 8 | 9 | 10 |
|---|---|---|---|---|
| | REMAINING ENDURANCE OF UNIT | 50 | 40 | 30 |

FIG. 11D $\sigma = 12.9$

| PRINTER (1) | UNIT NO. | 7 | 8 | 9 | 10 |
|---|---|---|---|---|---|
| | REMAINING ENDURANCE OF UNIT | 60 | 50 | 40 | 30 |

FIG. 11E $\sigma = 15.8$

| PRINTER (1) | UNIT NO. | 6 | 7 | 8 | 9 | 10 |
|---|---|---|---|---|---|---|
| | REMAINING ENDURANCE OF UNIT | 70 | 60 | 50 | 40 | 30 |

MORE THAN TWICE

FIG. 11F $\sigma = 66.8$

| PRINTER (1) | UNIT NO. | 5 | 6 | 7 | 8 | 9 | 10 |
|---|---|---|---|---|---|---|---|
| | REMAINING ENDURANCE OF UNIT | 210 | 70 | 60 | 50 | 40 | 30 |

FIG. 11G

| PRINTER (1) | UNIT NO. | 1 | 2 | 3 | 4 | 5 | 6 | 7 | 8 | 9 | 10 |
|---|---|---|---|---|---|---|---|---|---|---|---|
| | REMAINING ENDURANCE OF UNIT | 250 | 240 | 230 | 220 | 210 | 70 | 60 | 50 | 40 | 30 |

GROUP (A) — GROUP (B)

CONTROL APPARATUS FOR ASSIGNING A PRINT JOB, IMAGE FORMING APPARATUS, IMAGE FORMING SYSTEM, AND PROGRAM

The entire disclosure of Japanese patent Application No. 2018-053991, filed on Mar. 22, 2018, is incorporated herein by reference in its entirety.

BACKGROUND

Technological Field

The present disclosure relates to a control apparatus, an image forming apparatus, an image forming system, and a program.

Description of the Related Art

Conventionally, an image forming apparatus integrating functions of copy, network print, facsimile, scanning, and the like has been widely used. Various units are mounted in such an image forming apparatus. Since such units are consumables, the copy function or the like may not be used at times depending on usage conditions. In view of the above, there has been proposed a technique in which usage conditions of each unit are managed to notify a user of availability of various functions that can be provided by an image forming apparatus (see, for example, JP 2014-017728 A). In addition, there has also been proposed a technique in which an endurance state of each unit of a plurality of image forming apparatuses existing on a network is checked to assign a print job to an image forming apparatus having a high endurance state (see, for example, JP 2009-238072 A).

Incidentally, the endurance state is different for each unit in many cases. A unit after a lapse of, for example, the endurance number of sheets as the endurance state has a risk of generating poor image quality or the like and is subject to maintenance. However, the maintenance timing differs depending on usage environment or contents of the transmitted print job. In view of the above, there has been proposed a technique in which, instead of replacing each of a plurality of units in each case, a print job is assigned to, among a plurality of image forming apparatuses existing on a network, the forming apparatus with the largest endurance number of sheets until the next regular maintenance obtained from the past total usage amount with an image forming apparatus including a plurality of units as a unit (see, for example, JP H11-038845 A).

However, in the conventional technique as disclosed in JP 2014-017728 A, it is merely notified of the image forming apparatus in which various functions can be used, and the cost required for replacing each unit is not reduced. In the conventional technique as disclosed in JP 2009-238072 A, a print job is only assigned to an image forming apparatus having a high endurance state, and the cost required for replacing each unit is incurred in each case when the endurance state is different for each unit. In the conventional technique as disclosed in JP H11-038845 A, since an image forming apparatus to which a print job is assigned is determined on the basis of the past total usage amount of the image forming apparatus, when the endurance number of sheets differs for each unit, units are used while the difference in the endurance number of sheets is kept as it is. It is therefore necessary to replace each unit in which the endurance number of sheets has lapsed among the respective units, and a service person needs to visit for replacement work of the unit of the image forming apparatus in each time. While the unit is being replaced, interruption of the use of the image forming apparatus is unavoidable. Therefore, according to the conventional techniques as disclosed in JP 2014-017728 A, JP 2009-238072 A, and JP H11-038845 A, not only the service cost increases, but also the machine downtime increases.

Summary

The present disclosure has been conceived in view of such a situation, and it is intended to reduce the service cost and suppress the machine downtime.

To achieve the abovementioned object, according to an aspect of the present invention, a control apparatus reflecting one aspect of the present invention comprises: a communicator that communicates with an image forming apparatus capable of executing a print job; and a hardware processor that obtains, for each of the image forming apparatuses in communication with the communicator, a degree of variations in remaining endurance of each of a plurality of units included in the image forming apparatus, wherein the hardware processor assigns a print job to the image forming apparatus having the smallest degree of variations.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 6A to 6D are tables illustrating examples of various conditions for each printer group according to the first embodiment to which the present disclosure is applied;

FIGS. 11A to 11G are tables illustrating an exemplary grouping of units according to the fourth embodiment to which the present disclosure is applied.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
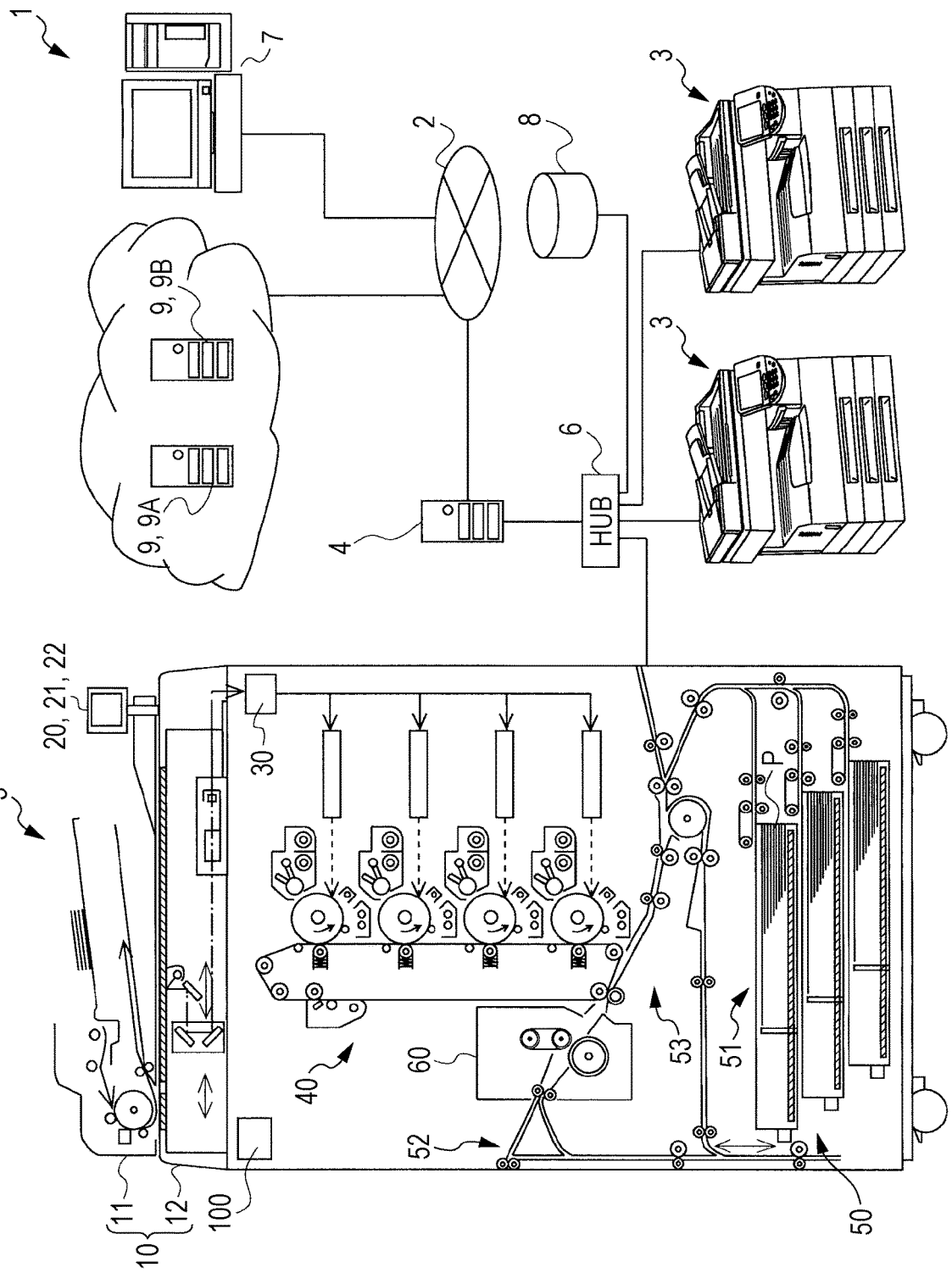
FIG. 1 is a diagram illustrating an exemplary system configuration of an image forming system including image forming apparatuses according to a first embodiment to which the present disclosure is applied.

FIG. 1 is a diagram illustrating an exemplary system configuration of an image forming system 1 including image forming apparatuses 3 according to a first embodiment to which the present disclosure is applied. Each of the image forming apparatuses 3 is connected to a control apparatus 7, a server 9A, and a server 9B via a network 2. Any one of the server 9A and the server 9B is referred to as a server 9 unless otherwise distinguished. Each of the image forming apparatus 3 is connected to a hub 6, and is capable of communicating various kinds of data with at least one server 9 via the network 2. The network 2 includes a local area network (LAN), the Internet, and the like. A form of connection to the network 2 may be wired connection or wireless connection. For example, a device such as a smartphone (not illustrated) can be connected to the network 2 by wireless connection using a wireless LAN router (not illustrated).

Each of the image forming apparatuses 3 is installed in the same intranet. The image forming apparatus 3 is an apparatus having a PC print function, a scanning function, a copy function, a facsimile function, a box storage function, and the like, which includes a multi-functional peripheral (MFP). The PC print function is a function of printing an image on a paper sheet P on the basis of the image data received from the control apparatus 7 or the like. The PC print function may be referred to as network printing, network print, or the like. The box storage function is a function by which a storage area called a box or a personal box is provided for each user so that each user stores and manages image files and the like using his/her own storage area. The box corresponds to a folder or a directory in a personal computer.

A storage device 8 is installed in the intranet. The storage device 8 can communicate with each of the image forming apparatuses 3. The storage device 8 incudes a network-attached storage (NAS) or the like. A gateway server 4 is further installed in the intranet. With such a system configuration, a firewall function can be implemented in the gateway server 4 so that access from the outside to the intranet is limited more strictly than access from the intranet to the outside. The control apparatus 7 can function as a client for using respective services of the image forming apparatus 3 and the server 9. As the control apparatus 7, a laptop personal computer, a desktop personal computer, a tablet computer, or the like is used. In a similar manner to the control apparatus 7, a device such as a smartphone (not illustrated) may function as a client for using the respective services of the image forming apparatus 3 and the server 9.

The server 9 can provide an online storage via time network 2. For example, image data may be stored, and the image data may be provided in response to a request from the control apparatus 7. The server 9 may use a web server or a cloud server including a common gateway interface (CGI) or the like. In a case where respective image forming apparatuses 3 are installed in an office, the server 9 may centrally manage the image forming apparatuses 3 to manage the endurance state of various units included in the image forming apparatus 3. For example, in a case where a print job including an instruction for executing a large amount of output is assigned to, among the image forming apparatuses 3, a low-speed one, the print job may be assigned to a high-speed one to change the print job to an optimum output destination. When the server 9 remotely detects the endurance state related to each unit of the image forming apparatus 3, it may perform a dispatch request to an engineer depending on the detected endurance state to arrange replacement or replenishment of respective units that are consumables. The server 9 integrally manages each centralized print center existing in the office, whereby the print job can be directly ordered from the control apparatus 7.

The image forming apparatus 3 forms a color image of an intermediate transfer type using an electrophotographic process technique. The image forming apparatus 3 employs, for example, a vertical tandem system in which a photosensitive drum corresponding to respective four colors Y, M, C, and K are disposed in series in the running direction of an intermediate transfer belt, that is, in the vertical direction, and toner images of the respective colors are successively transferred to the intermediate transfer belt in a single procedure. Accordingly, the image forming apparatus 3 transfers toner images of the respective colors yellow (Y), magenta (M), cyan (C); and black (K) formed on the photosensitive drum onto the intermediate transfer belt (primary transfer), superimposes the toner images of the four colors on the intermediate transfer belt, and then transfers the toner image onto a paper sheet P (secondary transfer), thereby forming an image. The image forming apparatus 3 includes an image reader 10, an operation/display unit 20, an image processor 30, an image former 40, a sheet conveyer 50, a fixing part 60, and a controller 100. The controller 100 includes a central processing unit (CPU), a read-only memory (ROM), a random access memory (RAM), and the like. The CPU reads, from the ROM, a program corresponding to processing details, loads the program into the RAM, and controls operation of each unit of the image forming apparatus 3 in cooperation with the loaded program. Each unit is, for example, the photosensitive drum, the fixing part 60, or the intermediate transfer belt, or a charging unit, an exposure unit, a developing unit, or the like to be described later. All items to be replaced according to the endurance state are treated as units. The unit may include materials. At least one of the toner and the paper sheet P corresponds to the material. Note that the controller 100 is configured as a hardware processor.

The image reader 10 includes an automatic document feeder 11, a document image scanner 12, and the like. The automatic document feeder 11 is referred to as an auto document feeder (ADF). The automatic document feeder 11 conveys, with a conveying mechanism, a document placed on a document tray and sends it to the document image scanner 12. The automatic document feeder 11 can successively read images of a large number of documents placed on the document tray. Note that the automatic document feeder 11 can read both faces of each document with a sheet inverting mechanism. The document image scanner 12 optically scans a document conveyed onto a contact glass from the automatic document feeder 11 or a document placed on the contact glass. The document image scanner 12 forms, by optical scanning, an image of reflected light from the document on a light receiving surface of a charge-coupled device (CCD) sensor, thereby reading the document image formed on the document. The image reader 10 generates input image data of the document image on the basis of a result of the reading performed by the document image scanner 12. The input image data is supplied to the image processor 30, and the image processor 30 executes preset image processing. The operation/display unit 20 includes, for example, a touch panel-type liquid crystal display (LCD), and functions as a display 21 and an operation unit 22. The display 21 displays various operation screens, image conditions, operation conditions of each function, and the like in accordance with a display control signal input from the controller 100. The operation unit 22 includes various operation keys such as a numeric keypad and a start key. The operation unit 22 receives various input operations made by the user, thereby generating an operation signal. The operation signal is output to the controller 100.

The image processor 30 includes a circuit that performs digital image processing on the input image data in accordance with default settings or user settings. For example, under control of the controller 100, the image processor 30 performs tone correction on the input image data on the basis of a tone correction table in which tone correction data is set. In addition to the tone correction, the image processor 30 also performs, on the input image data, various kinds of correction processing such as color correction and shading correction, compression processing, and the like. The image former 40 performs various kinds of processing on the basis of the input image data having been subject to various kinds of digital image processing as described above. The image former 40 forms images of respective color tones of a Y component, M component, C component, and K component on the basis of the input image data. The image former 40 includes an intermediate transfer unit including a photosensitive drum, a charging unit, an exposure unit, a developing unit, and an intermediate transfer belt. The surface of the photosensitive drum is uniformly charged by corona discharge of the charging unit. The exposure unit irradiates the photosensitive drum with laser light corresponding to the image of each color component, whereby an electrostatic latent image of each color component is formed on the surface of the photosensitive drum. The developing unit supplies the toner of each color component to the surface of the photosensitive drum so that the electrostatic latent image is visualized, thereby forming a toner image. The toner image is transferred onto the paper sheet P by the intermediate transfer unit. The fixing part 60 heats and pressurizes the toner image transferred onto the paper sheet P, thereby fixing the toner image on the paper sheet P. The sheet conveyer 50 includes a sheet feeder 51, a sheet ejector 52, a conveying path 53, and the like. The sheet feeder 51 is accommodated for each preset type on the basis of a basis weight, a size, and the like of the paper sheet P. The conveying path 53 conveys the paper sheet P stored in the sheet feeder 51 or the paper sheet P bearing an image formed on either face thereof. The sheet ejector 52 ejects the paper sheet P on which the image is formed outside the machine.

Figure 2:
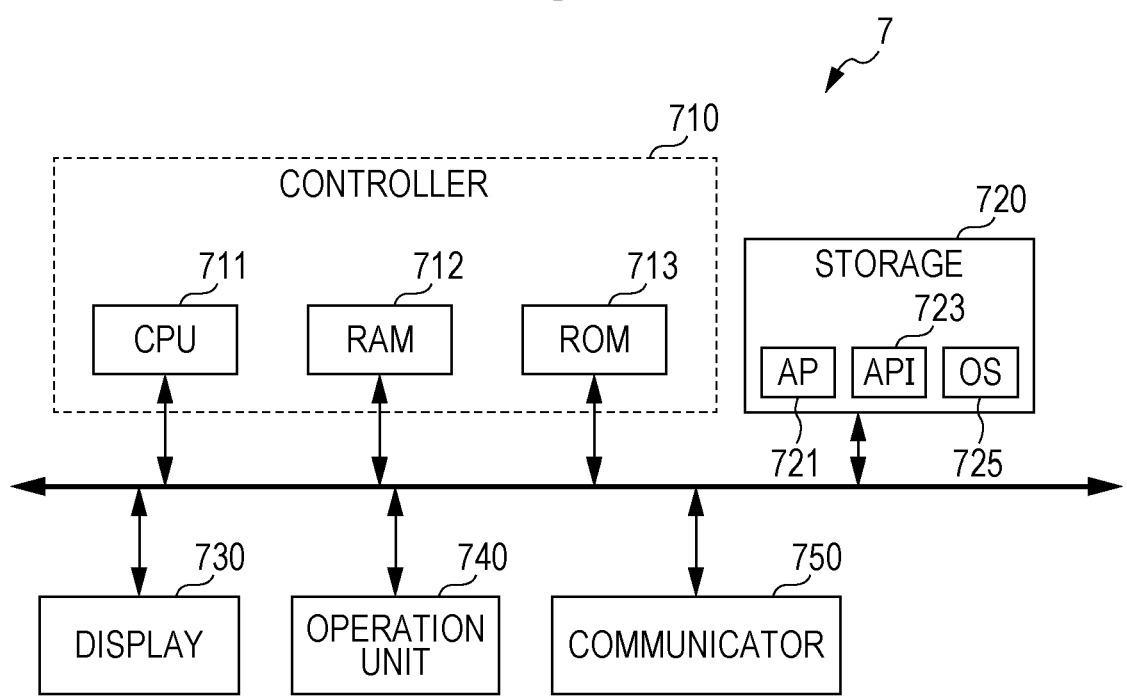
FIG. 2 is a block diagram illustrating an exemplary functional configuration of a control apparatus according to the first embodiment to which the present disclosure is applied.

FIG. 2 is a block diagram illustrating an exemplary functional configuration of the control apparatus 7 according to the first embodiment to which the present disclosure is applied. The control apparatus 7 includes a CPU 711, a RAM 712, a ROM 713, a storage 720, a display 730, an operation unit 740, a communicator 750, and the like. The CPU 711, the RAM 712, and the ROM 713 function as a controller 710. Note that the controller 710 is configured as a hardware processor. The communicator 750 communicates with the image forming apparatus 3 capable of executing a print job, the server 9, or the like according to a protocol such as TCP/IP. In the storage 720, an operating system 725, an application 721 for executing various kinds of processing, and an application programming interface 723 are installed. Programs included in them are loaded into the RAM 712 as necessary, and are executed by the CPU 711. The controller 710 obtains, for each image forming apparatus 3 in communication with the communicator 750, a degree of variations in remaining endurance of each of a plurality of units included in the image forming apparatus 3. The controller 710 assigns a print job to one of the image forming apparatuses 3 having the smallest degree of variations.

Figure 3A:
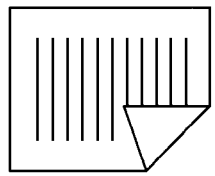
FIGS. 3A and 3B are block diagrams illustrating exemplary load information according to the first embodiment to which the present disclosure is applied.
Figure 3B:
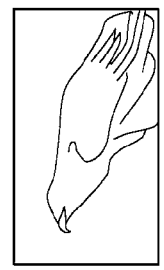

The controller 710 obtains the remaining endurance of each unit on the basis of the load information corresponding to the print job. FIGS. 3A and 3B are block diagrams illustrating exemplary load information according to the first embodiment to which the present disclosure is applied. As illustrated in FIGS. 3A and 3B, the load information defines the number of reduction points of the remaining endurance for each unit according to the print job. Accordingly, a rule for calculating the load information varies depending on whether the print job is a character job or an image job. The load information calculation rule is set such that the remaining endurance of a unit to which a high point is given is further reduced. Here, the remaining endurance of the unit indicates the residual available amount of use of the unit capable of maintaining the usable state of the unit. FIG. 3A is a diagram illustrating an example of the load information calculation rule in the case where the print job is the character job. The character job is a low coverage, whereby the amount of external additives is small. Therefore, from the view point of the endurance state, the character job is disadvantageous for the photosensitive drum, and is advantageous for the fixing part 60. In view of the above, as illustrated in FIG. 3A, a higher point is given to the unit in the case of the photosensitive drum than in the case of the fixing part 60. FIG. 3B is a diagram illustrating au example of the load information calculation rule in the case where the print job is the image job. The image job is a medium coverage, whereby the amount of external additives is large. Therefore, from the view point of the endurance state, the image job is advantageous for the photosensitive drum, and is disadvantageous for the fixing part 60. In view of the above, as illustrated in FIG. 3B, a higher point is given to the unit in the case of the fixing part 60 than in the case of the photosensitive drum. That is, the load applied to the unit is determined on the basis of the amount of toner used per page. Therefore, the load information may be determined according to the coverage specified by the print job. Specifically, an assumed toner consumption amount may be obtained on the basis of the print contents and the coverage assumed from the print job, and the load information may be obtained from the assumed toner consumption amount that has been obtained. Here, the endurance state indicates a residual state in which the unit can be maintained in the usable state, such as the remaining endurance of the unit and the endurance number of sheets of the unit.

Figure 4:
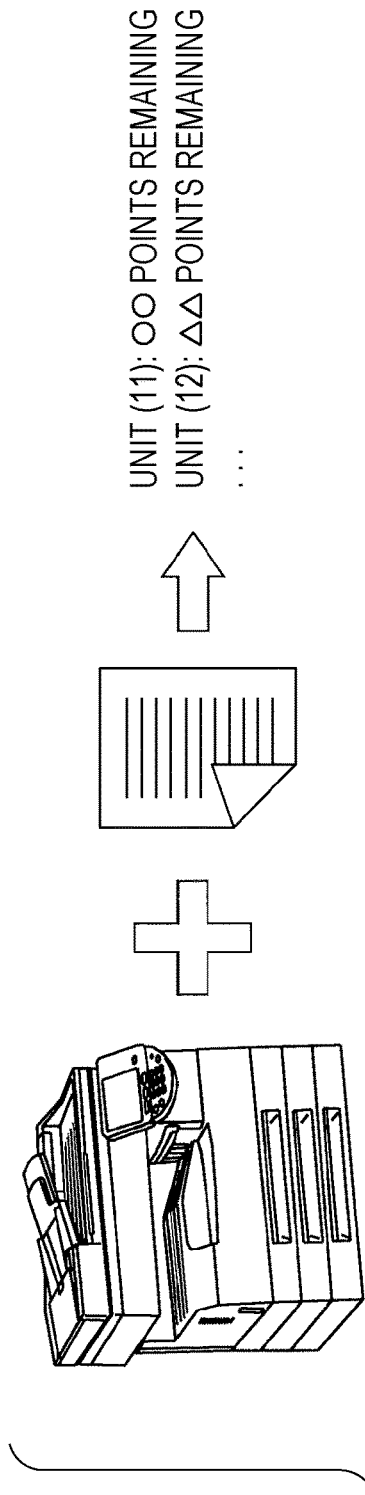
FIG. 4 is a diagram illustrating an example of a degree of variations in remaining endurance of respective units according to the first embodiment to which the present disclosure is applied.

FIG. 4 is a diagram illustrating an example of the degree of variations in remaining endurance of respective units according to the first embodiment to which the present disclosure is applied. In the example of FIG. 4, a standard deviation $\sigma$ of the remaining endurance of the units is used as the degree of variations in the remaining endurance of the respective units in the case where the print job is the character job. One of the units corresponds to the photosensitive drum, and another one of the units corresponds to the fixing part 60. The standard deviation $\sigma$ of the remaining endurance of the units differs depending on a printer. For example, in each of a printer (1) and a printer (2), the remaining endurance of the unit after execution of the print job is smaller than the remaining endurance of the unit before execution of the print job according to the number of printed sheets. For example, in the printer (1), the standard deviation σ of the remaining endurance of the units is 120. Meanwhile, in the printer (2), the standard deviation σ of the remaining endurance of the units is 92. Since the degree of variations in the remaining endurance of the units is smaller in the case of the printer (2) than in the case of the printer (1), the standard deviation σ of the remaining endurance of the units becomes lower when the print job is assigned to the printer (2), Therefore, the remaining endurance of the units is leveled when the print job is assigned to the printer (2). In other words, the controller 710 assigns the print job to one of the image forming apparatuses 3 having the smallest standard deviation σ.

Figure 5:
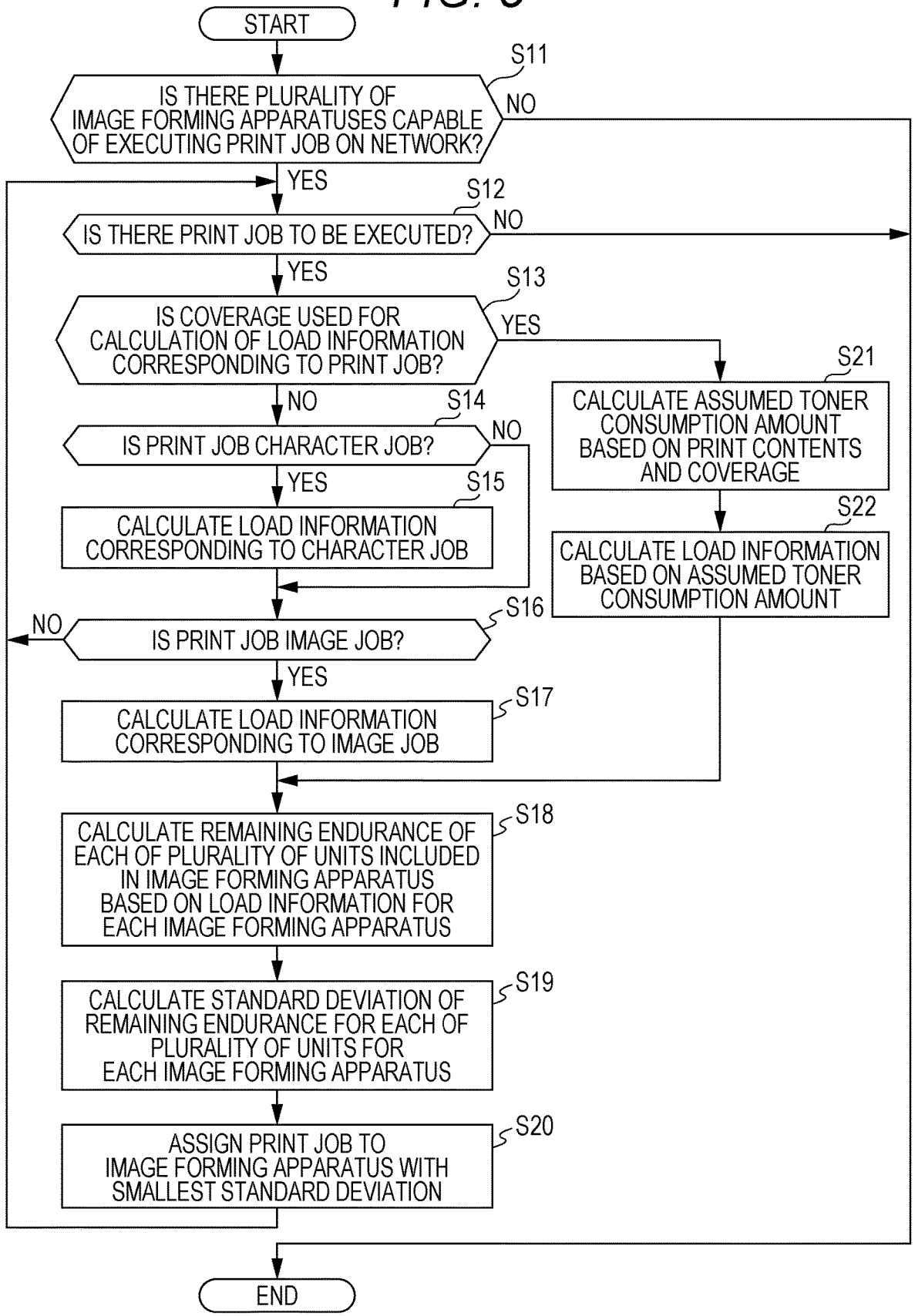
FIG. 5 is a flowchart illustrating exemplary control according to the first embodiment to which the present disclosure is applied.

FIG. 5 is a flowchart illustrating exemplary control according to the first embodiment to which the present disclosure is applied. The process in steps S11 to S22 is a leveling process for leveling the remaining endurance of the units by assigning a print job from among a plurality of image forming apparatuses 3, which can be implemented as the application 721. Accordingly, the image forming apparatus 3 to which the print job is assigned forms an image on the paper sheet P on the basis of the assigned print job. In step S11, time controller 710 determines whether a plurality of image forming apparatuses 3 capable of executing the print job exists on the network 2. When the controller 710 determines that a plurality of image forming apparatuses 3 capable of executing the print job exists on the network 2 (Y in step S11), the process proceeds to processing of step S12. When the controller 710 determines that a plurality of image forming apparatuses 3 capable of executing the print job does not exist on the network 2 (N in step S11), the process of assigning the print job from among the plurality of image forming apparatuses 3 is terminated. In step S12, the controller 710 determines whether there is a print job to be executed. When the controller 710 determines that there is a print job to be executed (Y in step S12), the process proceeds to processing of step S13. When the controller 710 determines that there is no print job to be executed (N in step S12), the leveling process is terminated.

In step S13, the controller 710 determines whether to use a coverage for calculation of the load information corresponding to the print job. When the controller 710 determines to use the coverage for calculation of the load information corresponding to the print job (Y in step S13), the process proceeds to processing of step S21. In step S21, the controller 710 obtains an assumed toner consumption amount on the basis of the print contents and the coverage. In step S22, the controller 710 obtains the load information from the assumed toner consumption amount, and the process proceeds to processing of step S18. When the controller 710 determines not to use the coverage for calculation of the load information corresponding to the print job (N in step S13), the process proceeds to processing of step S14. In step S14, the controller 710 determines whether the print job is a character job. When the controller 710 determines that the print job is the character job (Y in step S14), the process proceeds to processing of step S15. When the controller 710 determines that the print job is not the character job (N in step S14), the process proceeds to processing of step S16.

In step S15, the controller 710 obtains the load information corresponding to the character job. In step S16, the controller 710 determines whether the print job is an image job. When the controller 710 determines that the print job is the image job (Y in step S16), the process proceeds to processing of step S17. When the controller 710 determines that the print job is not the image job (N in step S16), the process returns to the processing of step S12. In step S17, the controller 710 obtains the load information corresponding to the image job. In step S18, the controller 710 obtains, for each image forming apparatus 3, the remaining endurance of each of a plurality of units included in the image forming apparatus 3 on the basis of the load information. In step S19, the controller 710 calculates, for each image forming apparatus 3, a standard deviation σ of the remaining endurance of each of the plurality of units. In step S20, the controller 710 assigns the print job to one of the image forming apparatuses 3 having the smallest standard deviation σ, and the process returns to the processing of step S12. Note that, in a case where the print job is neither the character job nor the image job, there is a possibility that the print job is broken.

Figure 7A:
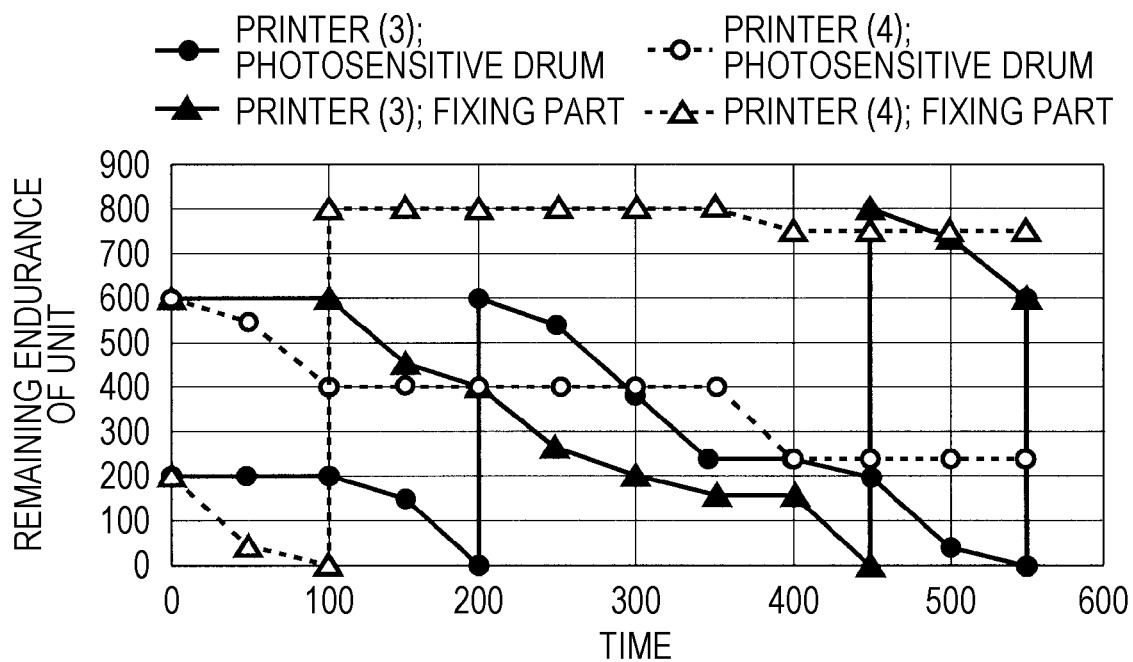
FIGS. 7A and 7B are graphs illustrating an exemplary maintenance timing of a unit according to the first embodiment to which the present disclosure is applied.
Figure 7B:
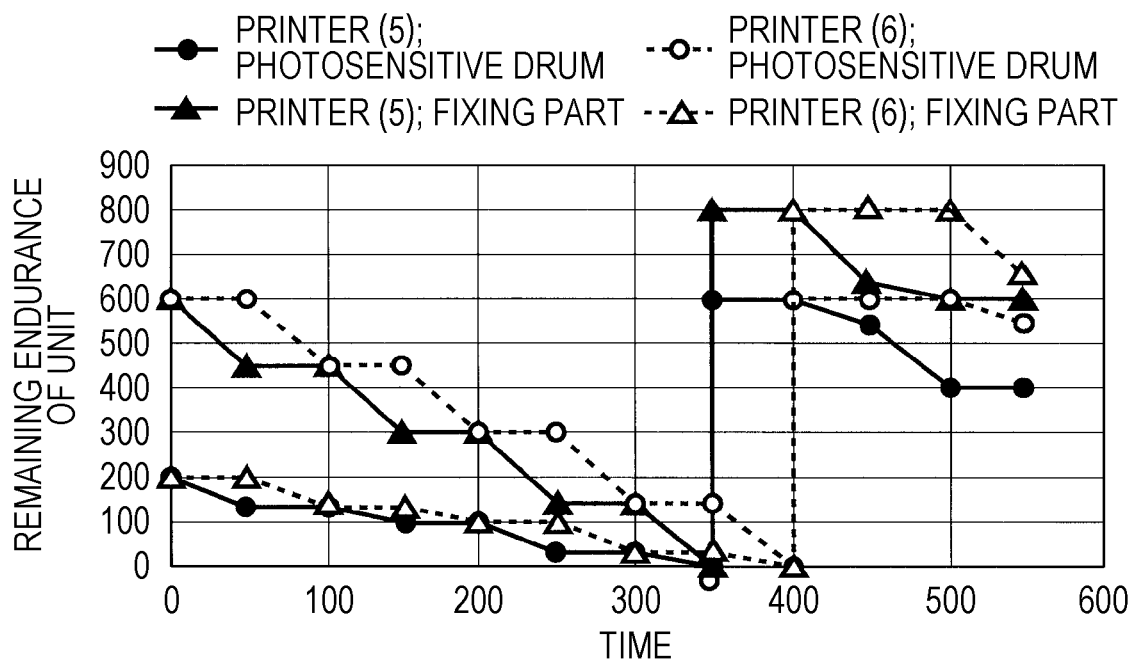

FIGS. 6A to 6D are tables illustrating examples of various conditions for each printer group according to the first embodiment to which the present disclosure is applied. Specifically, FIG. 6A is a table illustrating an example of initial remaining endurance of a unit for each unit. FIG. 6B is a table illustrating an example of the number of reduction points of the remaining endurance for each unit according to a print job. FIG. 6C is a table illustrating an example of print contents in which a print type and the number of printed sheets are exemplified as the print contents. FIG. 6D is a table illustrating an example of printings subject to the leveling process among respective printings and the remaining endurance of a current unit in each printing. FIGS. 7A and 7B are graphs illustrating an exemplary maintenance timing of a unit according to the first embodiment to which the present disclosure is applied. In the examples of FIGS. 7A and 7B, the various conditions for each printer group illustrated in FIGS. 6A to 6D are applied.

FIG. 7A is a graph illustrating an example of the remaining endurance of the unit that fluctuates as time passes with respect to printers (3) and (4) in which no leveling process is executed. FIG. 7B is a graph illustrating an example of the remaining endurance of the unit that fluctuates as time passes with respect to printers (5) and (6) in which the leveling is executed. Normally, as illustrated in FIG. 7A, the maintenance timing differs depending on usage environment or contents of a transmitted print job. For example, the endurance state for each unit varies depending on temperature, humidity, and the like. Further, the amount of toner used varies depending on the contents of the transmitted print job, whereby the endurance state of each unit varies depending on the contents of the transmitted print job. Therefore, as illustrated in FIG. 7A, the maintenance timings of the photosensitive drum and the fixing part 60 are irregular in both of the cases of the printer (3) and the printer (4). Since the unit to be subject to the maintenance is the photosensitive drum or the fixing part 60, the maintenance timing is a replacement timing of the photosensitive drum or the fixing part 60. Accordingly, the machine is stopped at each replacement timing, thereby increasing the machine downtime. Furthermore, a service person visits the site at each replacement timing, thereby increasing the service cost. On the other hand, in FIG. 7B, the maintenance timings are aligned at the same timing. Here, the term "timing" refers not only to a certain point of time but also to time during which the service person stays at the site visited for work, that is, a certain period of time should be permissible. As illustrated in FIG. 7B, the timing of the maintenance timings of the photosensitive drum and the fixing part 60 can coincide in both of the cases of the printer (5) and the printer (6). Therefore, although the machine is stopped at each replacement timing, the number of replacement timings itself is decreased, thereby suppressing the total machine downtime. In other words, the leveling process not only reduces the risk of an image defect into one machine, but also minimizes the downtime. Furthermore, the replacement timing itself is decreased, whereby the number of times a service person visits the site decreases, and the service work time also decreases. Therefore, the service cost decreases.

As described above, in the present embodiment, a print job is assigned to one of the image forming apparatuses 3 having the small degree of variations in the remaining endurance of respective units. Accordingly, the remaining endurance of respective units in the image forming apparatus 3 to which the print job is assigned is leveled, whereby a difference in maintenance timing of a plurality of units in the image forming apparatus 3 can be suppressed. Therefore, maintenance of a plurality of units in one image forming apparatus 3 can be performed at the same timing, whereby the number of times a service person visits the site decreases, and the number of times the use of the image forming apparatus 3 is interrupted due to the replacement work can also be decreased. As a result, the service cost can be reduced, and the machine downtime can be suppressed.

In other words, maintenance timings for respective units in one image forming apparatus 3 are coincide with each other so that a plurality of units can be replaced by one visit of a service person, whereby the number of times of the service visits decreases, and the machine downtime is suppressed. Therefore, the service cost can be reduced, and the machine downtime can be suppressed.

Moreover, in the present embodiment, the remaining endurance of each unit can be obtained on the basis of the load information corresponding to the print job. Therefore, the remaining endurance of the unit can be obtained for each print job, whereby processing can be executed for each print job.

In the present embodiment, the degree of variations is the standard deviation σ of the remaining endurance of respective units. Therefore, the degree of variations accurately appears, whereby the image forming apparatus 3 suitable for leveling the remaining endurance of a plurality of units can be selected.

Moreover, in the present embodiment, a print job is assigned to one of the image forming apparatuses 3 having the smallest standard deviation σ. Therefore, the image forming apparatus 3 having the small variation in remaining endurance of the units is appropriately selected, Whereby the timing of the maintenance timings of the units in one image forming apparatus 3 can coincide.

Moreover, in the present embodiment, one of the units corresponds to the photosensitive drum, and another one of the units corresponds to the fixing part 60. Accordingly, the print job can be assigned according to the consumption state of the photosensitive drum and the fixing part 60. The remaining endurance of the photosensitive drum and the fixing part 60 changes due to the influence of external additives. The amount of the external additives is small when the print job is a character job, and is large when the print job is an image job. Since the character job is a low coverage, the amount of the external additives is small, which is disadvantageous for the photosensitive drum and is advantageous for the fixing unit. Since the image job is a medium coverage, the amount of the external additives is large, which is advantageous for the photosensitive drum and is disadvantageous for the fixing unit. Therefore, the remaining endurance of the unit affected by the character job or the image job can be accurately monitored.

Moreover, in the present embodiment, the load information is determined according to the coverage specified by the print job. Accordingly, if the unit is affected by the remaining endurance due to the coverage, the load information can be accurately determined, whereby the accuracy of the load information can be improved.

Moreover, in the present embodiment, the server 9 can execute various kinds of processing of the controller 710. Accordingly, processing for obtaining the degree of variations is incorporated without changing the hardware of each image forming apparatus 3, whereby a highly scalable system can be constructed.

Moreover, in the present embodiment, at least one of the plurality of image forming apparatuses 3 can execute the various kinds of processing of the controller 710. Accordingly, the processing for obtaining the degree of variations is incorporated without largely changing the system as a whole, whereby a highly scalable system can be constructed.

Second Embodiment

Figure 8:
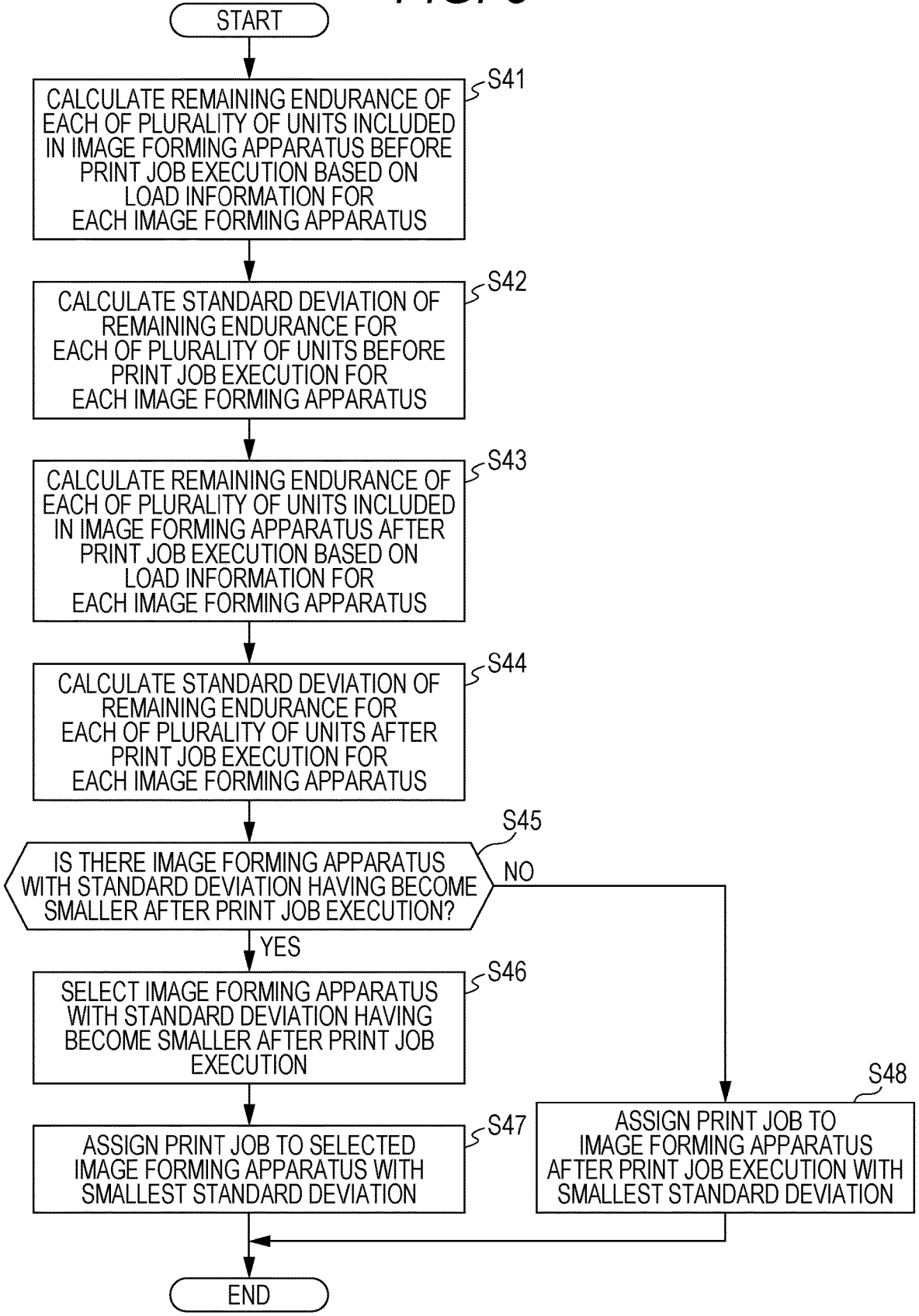
FIG. 8 is a flowchart illustrating exemplary control according to a second embodiment to which the present disclosure is applied.

In a second embodiment, descriptions of configurations and functions similar to those in the first embodiment are omitted. The second embodiment is another example of the leveling process, and processing of steps S11 to S17, step S21, and step S22 in the first embodiment is common. In the second embodiment, processing different from the processing of steps S18 to S20 in the first embodiment is executed. More specifically, a controller 710 assigns a print job to an image forming apparatus having a standard deviation σ that is smaller after print job execution than before the print job execution. FIG. 8 is a flowchart illustrating exemplary control according to the second embodiment to which the present disclosure is applied.

In step S41, the controller 710 obtains, for each image forming apparatus 3, remaining endurance of each of a plurality of units included in the image forming apparatus 3 in the case before print job execution on the basis of load information. In step S42, the controller 710 calculates, for each image forming apparatus 3, a standard deviation σ of the remaining endurance of each of the plurality of units in the case before the print job execution. In step S43, the controller 710 obtains, for each image forming apparatus 3, remaining endurance of each of the plurality of units included in the image forming apparatus 3 in the case after the print job execution on the basis of load information. In step S44, the controller 710 calculates, for each image forming apparatus 3, the standard deviation σ of the remaining endurance of each of the plurality of units in the case after the print job execution. In step S45, the controller 710 determines whether there is an image forming apparatus 3 having the standard deviation σ that becomes smaller after the print job execution. When the controller 710 determines that there is the image forming apparatus 3 having the standard deviation σ that becomes smaller after the print job execution (Y in step S45), the process proceeds to processing of step S46. In step S46, the controller 710 selects the image forming apparatus 3 having the standard deviation σ that becomes smaller after the print job execution. In step S47, the controller 710 assigns the print job to one of the selected image forming apparatuses 3 having the smallest standard deviation σ, and the leveling process is terminated. On the other hand, when the controller 710 determines that there is no image forming apparatus 3 having the standard deviation σ that becomes smaller after the print job execution (N in step S45), the process proceeds to processing of step S48. In step S48, the controller 710 assigns the print job to one of the image forming apparatuses 3 after the print job execution having the smallest standard deviation σ, and the leveling process is terminated. In other words, in the present embodiment, a process for determining whether the standard deviation σ before the print job execution is larger than the standard deviation σ after the print job execution is added as a criterion.

As described above, in the present embodiment, the print job is assigned to the one having the standard deviation σ that is smaller after the print job execution than before the print job execution. Accordingly, the image forming apparatus 3 having the small variation in remaining endurance of the units after the print job execution is selected, whereby the degree of variations in the selected image forming apparatus 3 can be further reduced. Therefore, the timing of the maintenance timings of the units can further coincide.

Third Embodiment

Figure 9:
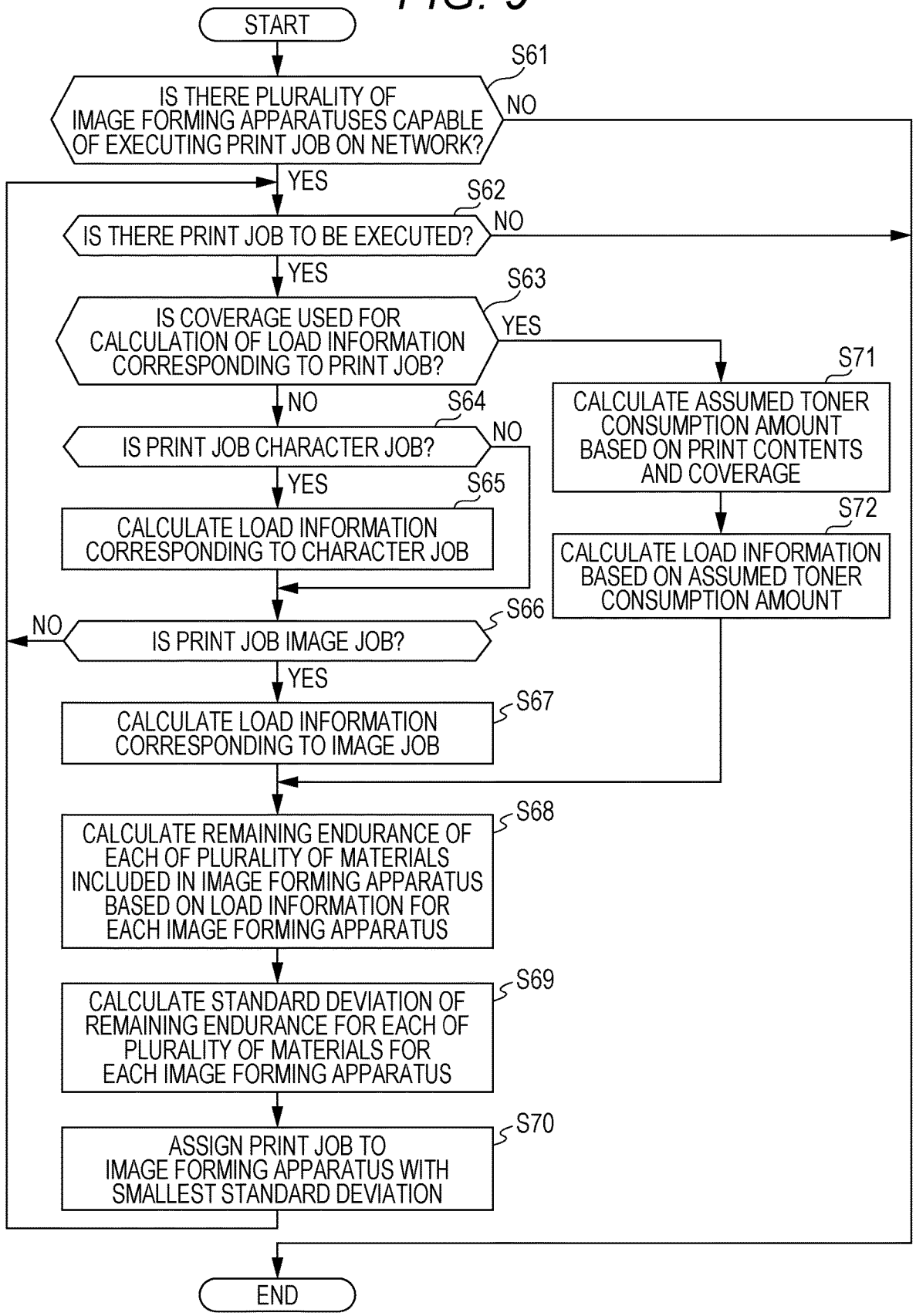
FIG. 9 is a flowchart illustrating exemplary control according to a third embodiment to which the present disclosure is applied.

In a third embodiment, descriptions of configurations and functions similar to those in the first and second embodiments are omitted. The third embodiment is different from the first and second embodiments in that the leveling process is executed on materials serving as a unit. FIG. 9 is a flowchart illustrating exemplary control according to the third embodiment to which the present disclosure is applied. The process in steps S61 to S72 is a leveling process. The processing in steps S61 to S67, step S70, step S71, and step S72 are similar to the processing in steps S11 to 17, step S20, step S21, and step S22, and descriptions thereof will be omitted. In step S68, a controller 710 obtains, for each image forming apparatus 3, remaining endurance of each of a plurality of materials included in the image forming apparatus 3 on the basis of load information. In step S69, the controller 710 calculates, for each image forming apparatus 3, a standard deviation σ of the remaining endurance of each of the plurality of materials.

As described above, in the present embodiment, a unit includes materials, and at least one of toner and a paper sheet P corresponds to the material. Accordingly, a print job can be assigned according to the consumption state of the toner and the paper sheet P. Note that the unit to be subject to maintenance is at least one of the toner and the paper sheet P in the present embodiment. Therefore, a maintenance timing is a replenishment timing of at least one of the toner and the paper sheet P. That is, in the present embodiment, the replenishment timing of each unit can be adjusted to the same timing.

Fourth Embodiment

In a fourth embodiment, descriptions of configurations and functions similar to those in the first to third embodiments are omitted. In the fourth embodiment, in a case where the number of units to be subject to a leveling process is large, grouping is performed according to remaining endurance of respective units, thereby dividing the units into a group of the units each of which has the small remaining endurance and a group of the units each of which has the large remaining endurance. In the fourth embodiment, the leveling process is executed on the group of the units each of which has the small remaining endurance. Specifically, a controller 710 determines a degree of variations in the remaining endurance of respective units for the units from among the respective units selected on the basis of the remaining endurance of each unit, the degree of variations in the remaining endurance of each unit, and a criterion for determining the degree of variations in the remaining endurance of the respective units.

Figure 10:
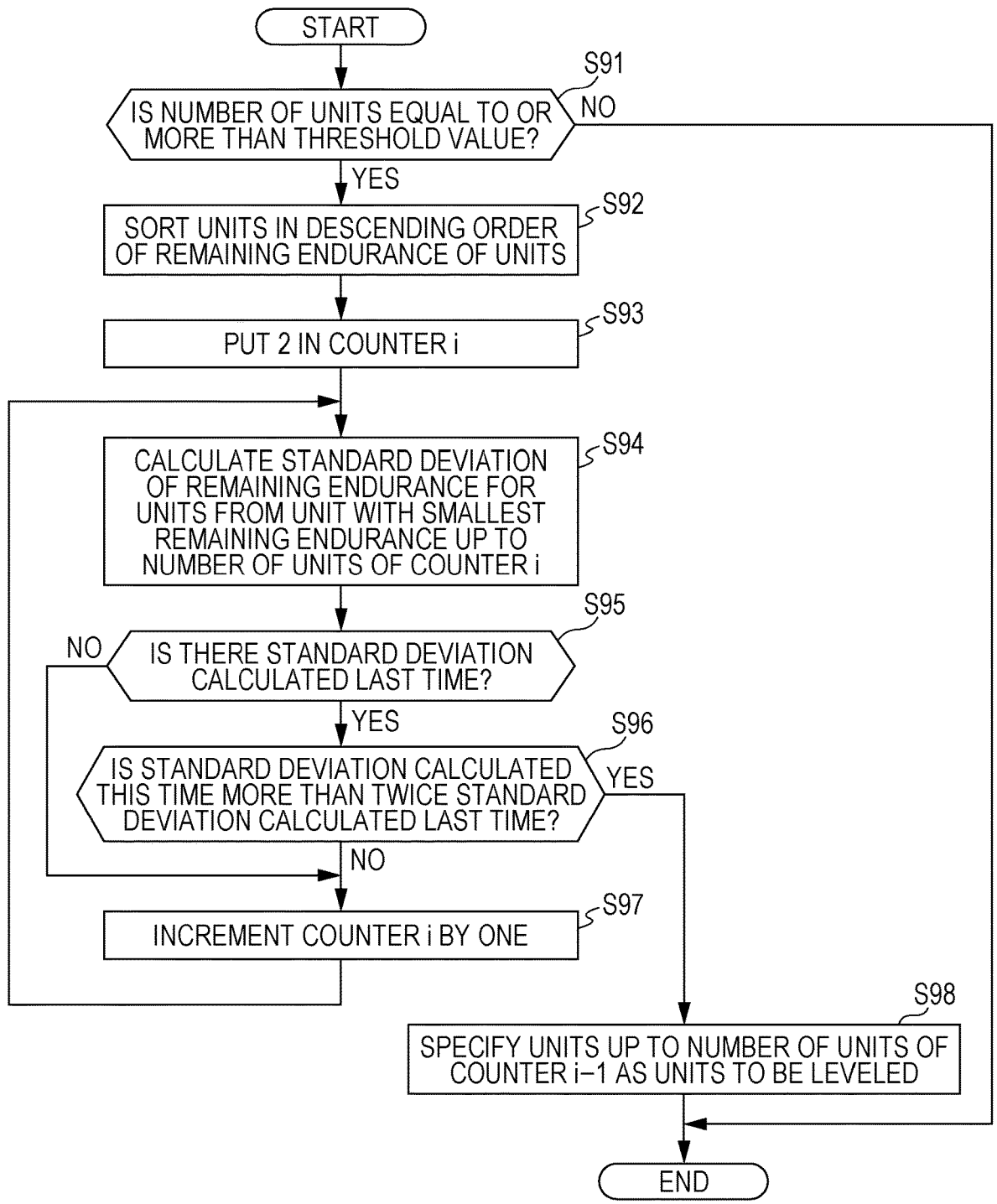
FIG. 10 is a flowchart illustrating exemplary control according to a fourth embodiment to which the present disclosure is applied.

FIG. 10 is a flowchart illustrating exemplary control according to the fourth embodiment to which the present disclosure is applied. The process in steps S91 to S98 is a process for specifying units to be leveled, which can be implemented as an application 721. The specifying process uses determination whether a standard deviation σ calculated this time is equal to or more than twice the standard deviation σ calculated last time as a criterion of the grouping of the degree of variations, but is not particularly limited thereto. Determination whether the standard deviation σ calculated this time is more than three times the standard deviation σ calculated last time may be used as a criterion of the grouping of the degree of variations. FIGS. 11A to 11G are tables illustrating an example of the grouping of the units according to the fourth embodiment to which the present disclosure is applied. FIG. 11A is a table illustrating an example in which a plurality of units included in the image forming apparatus 3 is sorted in descending order of the remaining endurance of the respective units. FIG. 11B is a table illustrating an example of the standard deviation σ of the remaining endurance of the units when a counter i is two. FIG. 11C is a table illustrating an example of the standard deviation σ of the remaining endurance of the units when the counter i is three. FIG. 11D is a table illustrating an example of the standard deviation σ of the remaining endurance of the units when the counter i is four. FIG. 11E is a table illustrating an example of the standard deviation σ of the remaining endurance of the units when the counter i is five. FIG. 11F is a table illustrating an example of the standard deviation σ of the remaining endurance of the units when the counter i is six. FIG. 11G is a table illustrating an example in which the respective units are grouped.

In step S91, the controller 710 determines whether the number of units is equal to or more than a threshold value. When the controller 710 determines that the number of units is equal to or more than the threshold value (Y in step S91), the process proceeds to processing of step S92. When the controller 710 determines that the number of units is less than the threshold value (N in step S91), the specifying process is terminated. The threshold value is 10, for example, but is not particularly limited thereto. In step S92, the controller 710 sorts the units in descending order of the remaining endurance of the units. For example, as illustrated in FIG. 11A, data of a combination of the unit and the remaining endurance of the unit is sorted in descending order of the remaining endurance of the units. In step S93, the controller 710 puts two in the counter i. In step S94, the controller 710 calculates the standard deviation σ of the remaining endurance of the units from the unit having the smallest remaining endurance up to the number of units of the counter i. For example, as illustrated in FIG. 11B, the standard deviation σ of the remaining endurance of the two units is 7.1.

In step S95, the controller 710 determines whether there is the standard deviation σ calculated last time. When the controller 710 determines that there is the standard deviation σ calculated last time (Y in step S95), the process proceeds to processing of step S96. When the controller 710 determines that there is no standard deviation σ calculated last time (N in step S95), the process proceeds to processing of step S97. In step S96, the controller 710 determines whether the standard deviation σ calculated this time is equal to or more than twice the standard deviation σ calculated last time. When the controller 710 determines that the standard deviation σ calculated this time is equal to or more than twice the standard deviation σ calculated last time (Y in step S96), the process proceeds to processing of step S98. In step S98, the controller 710 specifies the units up to the number of units of the counter i−1 as the units to be leveled, and the specifying process is terminated. For example, the standard deviation σ illustrated in FIG. 11F is 66.8, and the standard deviation σ illustrated in FIG. 11E is 15.8. Accordingly, as illustrated in FIG. 11G, five units, that is, units (6) to (10) are grouped as a group (B) and are specified as the units to be leveled. On the other hand, when the controller 710 determines that the standard deviation σ calculated this time is less than twice the standard deviation σ calculated last time (N in step S96), the process proceeds to processing of step S97. In step S97, the controller 710 increments the counter i by one, and the process returns to the processing of step S94. For example, in the examples illustrated in FIGS. 11B to 11E, the standard deviation σ calculated this time is less than twice the standard deviation σ calculated last time.

As described above, in the present embodiment, a degree of variations with respect to the units front among the respective units selected on the basis of the remaining endurance, the degree of variations, and a criterion for grouping the degree of variations is obtained. Accordingly, the degree of variations with respect to the units selected according to the criterion for grouping, instead of all of the plurality of units, may be obtained. Therefore, the processing can be executed while suppressing the calculation cost.

Although the image forming system 1 to which the present disclosure is applied has been described on the basis of the embodiments, the present disclosure is not limited thereto, and may be modified without departing from the gist of the present disclosure.

For example, although the exemplary case where the various processes illustrated in FIG. 5 and FIGS. 8 to 10 are implemented in the control apparatus 7 has been described, it is not particularly limited thereto. For example, the various processes described above such as steps S11 to S22, steps S41 to S48, steps S61 to S72, and steps S91 to S98 may be implemented as the application 721 in the image forming apparatus 3 or the server 9. For example, in a case where the various processes described above are included in the image forming apparatus 3, the controller 100 may distinguish between the image forming apparatus 3 of its own apparatus and the image forming apparatus 3 of another apparatus. Specifically, the controller 100 may obtain, in each of the image forming apparatus 3 of the other apparatus and the image forming apparatus 3 of its own apparatus, a degree of variations in remaining endurance of at least two units included in each of the image forming apparatus 3 of the other apparatus and the image forming apparatus 3 of its own apparatus. The controller 100 may assign a print job to, out of the image forming apparatus 3 of the other apparatus and the image forming apparatus 3 of its own apparatus, the one having the smallest degree of variations. Further, although illustration is omitted, the various processes described above may be executed via a smartphone or the like in which the various processes described above are implemented.

Furthermore, although the exemplary case where the standard deviation σ of the remaining endurance of the units is used as the degree of variations in the remaining endurance of respective units has been described in the present embodiment, it is not particularly limited thereto. For example, the degree of variations in the remaining endurance of the respective units may be obtained on the basis of the Mahalanobis distance.

Moreover, although the exemplary case where the image forming apparatus 3 includes an MFP has been described in the present embodiment, it is not limited thereto. For example, the image forming apparatus 3 may include a copier. In this case, the leveling process described above is applied to units included in the copier.

Although embodiments of the present invention have been described and illustrated in detail, the disclosed embodiments are made for purposes of illustration and example only and not limitation. The scope of the present invention should be interpreted by terms of the appended claims.

What is claimed is:

1. A control apparatus comprising:
a communicator that communicates with a plurality of image forming apparatuses capable of executing a print job; and
a hardware processor that obtains, for each of the plurality of image forming apparatuses in communication with the communicator, a value reflecting a variation in remaining endurance of each of a plurality of units included in each of the plurality of image forming apparatuses, wherein
the hardware processor assigns a print job to the image forming apparatus having the smallest value.

2. The control apparatus according to claim 1, wherein the hardware processor obtains the remaining endurance of each of the units on the basis of load information corresponding to the print job.

3. The control apparatus according to claim 2, wherein the value is a standard deviation of the remaining endurance of each of the units.

4. The control apparatus according to claim 2, wherein the hardware processor determines the load information according to a coverage specified by the print job.

5. The control apparatus according to claim 3, wherein the hardware processor assigns the print job to the image forming apparatus having the smallest standard deviation.

6. The control apparatus according to claim 5, wherein the hardware processor assigns the print job to the image forming apparatus having the standard deviation that is smaller after executing the print job than before executing the print job.

7. The control apparatus according to claim 1, wherein one of the units corresponds to a photosensitive drum, and another one of the units corresponds to a fixing part.

8. The control apparatus according to claim 1, wherein the units include a material, and
the material corresponds to at least one of toner and a paper sheet.

9. The control apparatus according to claim 1, wherein the hardware processor obtains, from among the plurality of units, the degree of variations of units selected on the basis of the remaining endurance, and assigns a print job to units selected from among the plurality of units on the basis of the remaining endurance, the degree of variations, and a criterion for grouping the degree of variations.

10. The control apparatus according to claim 1, wherein the image forming apparatus is managed by a server, and the server is capable of executing various kinds of processing of the hardware processor.

11. The control apparatus according to claim 1, wherein the various kinds of processing of the hardware processor can be executed by at least one of the image forming apparatuses.

12. An image forming apparatus comprising:
a communicator that communicates with another image forming apparatus capable of executing a print job; and
a hardware processor that obtains, in each of the another image forming apparatus in communication with the communicator and the image forming apparatus, a value reflecting a variation in remaining endurance of at least two units included in each of the another image forming apparatus and the image forming apparatus, wherein
the hardware processor assigns the print job to, between the another image forming apparatus and the image forming apparatus, the image forming apparatus having the smallest value.

13. An image forming system comprising:
a communicator that communicates with a plurality of image forming apparatuses capable of executing a print job; and
a hardware processor that obtains, for each of the plurality of image forming apparatuses in communication with the communicator, a value reflecting a variation in remaining endurance of each of a plurality of units included in each of the plurality of image forming apparatuses, wherein
the hardware processor assigns a print job to the image forming apparatus having the smallest value.

14. A non-transitory recording medium storing a computer readable program causing a computer to function as:
a communicator that communicates with a plurality of image forming apparatuses capable of executing a print job; and
a hardware processor that obtains, for each of the plurality of image forming apparatuses in communication with the communicator, a value reflecting a variation in remaining endurance of each of a plurality of units included in each of the plurality of image forming apparatuses, wherein
the hardware processor assigns a print job to the image forming apparatus having the smallest value.

* * * * *